US012807180B2

(12) United States Patent
Ollis et al.

(10) Patent No.: US 12,807,180 B2
(45) Date of Patent: Nov. 24, 2026

(54) SYSTEM, METHOD, AND COMPUTER PROGRAM PRODUCT FOR DETECTING AND PREVENTING AN AUTONOMOUS DRIVING ACTION

(71) Applicant: FORD GLOBAL TECHNOLOGIES, LLC, Dearborn, MI (US)

(72) Inventors: Mark Ollis, Pittsburgh, PA (US); Ruben Zhao, San Mateo, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 899 days.

(21) Appl. No.: 17/686,659

(22) Filed: Mar. 4, 2022

(65) Prior Publication Data

US 2023/0278581 A1 Sep. 7, 2023

(51) Int. Cl.

| | |
|---|---|
| ***B60W 60/00*** | (2020.01) |
| ***B60W 30/095*** | (2012.01) |
| ***B60W 30/18*** | (2012.01) |
| ***B60W 40/04*** | (2006.01) |
| ***B60W 50/00*** | (2006.01) |

(52) U.S. Cl.

CPC .... *B60W 60/0011* (2020.02); *B60W 30/0956* (2013.01); *B60W 30/18159* (2020.02); *B60W 40/04* (2013.01); *B60W 50/0097* (2013.01); *B60W 60/0015* (2020.02); *B60W 60/00274* (2020.02); *B60W 2554/4041* (2020.02); *B60W 2554/4042* (2020.02); *B60W 2554/4043* (2020.02); *B60W 2554/4044* (2020.02); *B60W 2554/4046* (2020.02);

(Continued)

(58) Field of Classification Search

None

See application file for complete search history.

(56) References Cited

U.S. PATENT DOCUMENTS

| | | | |
|---|---|---|---|
| 10,836,405 B2 | 11/2020 | Wray et al. | |
| 11,551,548 B1 * | 1/2023 | Nayak | G08G 1/096827 |

(Continued)

FOREIGN PATENT DOCUMENTS

| | | |
|---|---|---|
| WO | 2019032353 A1 | 2/2019 |

OTHER PUBLICATIONS

International Search Report and Written Opinion of PCT/US2023/010735 mailed May 9, 2023, , 9 pages.

*Primary Examiner* — Steven Vu Nguyen
*Assistant Examiner* — Melanie G Huber
(74) *Attorney, Agent, or Firm* — Frank A. MacKenzie; Brooks Kushman P.C.

(57) ABSTRACT

Provided are systems, methods, and computer program products for controlling an autonomous vehicle (AV) to maneuver in a roadway, comprising acquiring, data associated with an actor detected on a route of the AV in the roadway for sensing a trajectory of the actor, predicting that the trajectory of the actor includes at least one characteristic that is associated with invoking a conditionally disallowed action in the AV, automatically restricting the conditionally disallowed action from a motion plan of the AV to prevent the AV from executing the conditionally disallowed action in response to detecting that one or more conditions are present in the roadway, issuing a command to control the AV on a candidate trajectory generated to prevent an option for the conditionally disallowed action.

14 Claims, 8 Drawing Sheets

(52) U.S. Cl.
CPC . *B60W 2554/801* (2020.02); *B60W 2554/803* (2020.02); *B60W 2554/804* (2020.02)

(56) References Cited

U.S. PATENT DOCUMENTS

| | | | | |
|---|---|---|---|---|
| 2017/0192437 | A1* | 7/2017 | Bier | G05D 1/0278 |
| 2018/0321677 | A1 | 11/2018 | Letwin et al. | |
| 2020/0180616 | A1* | 6/2020 | Matsunaga | B60W 30/0956 |
| 2021/0012121 | A1 | 1/2021 | Urabe et al. | |
| 2021/0070286 | A1* | 3/2021 | Green | G05D 1/0246 |
| 2021/0108936 | A1* | 4/2021 | Seegmiller | B60W 60/00276 |
| 2021/0142421 | A1* | 5/2021 | Shalev-Shwartz | G06Q 10/00 |
| 2021/0206377 | A1* | 7/2021 | Mamchuk | G05D 1/0212 |
| 2021/0229656 | A1 | 7/2021 | Dax | |
| 2021/0370921 | A1* | 12/2021 | Silva | B60W 60/0027 |
| 2022/0176948 | A1* | 6/2022 | Hasegawa | B60W 30/095 |
| 2022/0340138 | A1* | 10/2022 | Seegmiller | B60W 30/045 |

* cited by examiner

SYSTEM, METHOD, AND COMPUTER PROGRAM PRODUCT FOR DETECTING AND PREVENTING AN AUTONOMOUS DRIVING ACTION

FIELD

This disclosure relates generally to motion planning to manage actions by preventing or allowing certain actions disallowed based on conditions during characteristic situations detected in the roadway while an autonomous vehicle traverses a route and, in some non-limiting embodiments or aspects, relates to systems, methods, and computer program products for detecting and preventing an autonomous vehicle from considering driving operations that may be unpredictable or disallowed.

BACKGROUND

An autonomous vehicle (AV) is required to find an optimal route from the AV's current location to a specified destination (e.g., a goal position, etc.) in a geographic location of a road network. To travel autonomously requires the formation and navigation of a route to a destination or goal. However, navigating a route involves the creation and evaluation of multiple trajectories that are combined and form a path through the road network. Such routing may require evaluating any number of potential lane changes as a result of other movers or other objects in the roadway, as well as, in-lane maneuvers such as tracking behind a mover, stopping when encountering a stationary object, or steering around to pass an object or mover in the roadway.

Creating a trajectory to handle lane changes may involve the processing and storing of vast amounts of data to account for constraints, such as objects in the roadway, or future maneuvers of actors, such as other movers (e.g., vehicles, bicyclists, motor cycles, scooters, etc.), or pedestrians, in the path of the AV. Such processing and storage of large amounts of roadway data defines the roadway, and accounts for all information concerning a state of the AV, including the dynamic capabilities of the AV in terms of managing the options available for maneuvering in the roadway.

Before performing maneuvers, the AV further performs numerous calculations while generating a number of possible candidate trajectories and then makes further calculations to optimize a candidate trajectory that has been selected. These calculations, in some cases, can be inefficient and expensive in terms of computing cost (e.g., computationally infeasible, etc.) because of the number of variations of transitions, start/end locations, transition start/end times, steering/speed profiles within a trajectory, and/or the like. In some driving situations, while navigating, the AV may have a need to evaluate additional actions while in a trajectory to make a complex maneuver. The set of maneuvers may include actions that are unconditionally available, but are not necessary for a particular situation or context when navigating a route. If an autonomous driving system considers such maneuvers, the set may become unnecessarily large and require even more resources for generating a route. In addition, known techniques of limiting maneuvers, such as discretization or random sampling, that are not guided by heuristics based on the AV's surroundings, may eliminate the one or more maneuvers that the AV must perform.

SUMMARY OF THE INVENTION

Accordingly, disclosed are improved computer-implemented systems, methods, and computer program products for trajectory scoring during an autonomous driving operation implemented with constraint independent margins to actors in the roadway for detecting and preventing an autonomous driving action.

According to non-limiting embodiments or aspects, provided is a computer-implemented method of controlling an autonomous vehicle (AV) to maneuver in a roadway, comprising: acquiring, by one or more processors of a vehicle computing system, data associated with an actor detected on a route of the AV in the roadway for sensing a trajectory of the actor; predicting, by the one or more processors, that the trajectory of the actor includes at least one characteristic that is associated with invoking a conditionally disallowed action in the AV; automatically restricting, by the one or more processors, the conditionally disallowed action from a motion plan of the AV to prevent the AV from executing the conditionally disallowed action in response to detecting that one or more conditions are present in the roadway; and issuing, by the one or more processors, a command to control the AV on a candidate trajectory generated to prevent an option for the conditionally disallowed action.

In some non-limiting embodiments or aspects, the data associated with the actor detected on a route of the AV further comprises information for sensing whether the actor traversing the roadway is on a trajectory predetermined to invoke the conditionally disallowed action in the AV.

In some non-limiting embodiments or aspects, the trajectory of the actor comprises at least one of a cross-ahead movement, a four way stop, a left turn yield, or an anti-routing movement, includes a characteristic associated with invoking a conditionally disallowed action, and the conditionally disallowed action includes compensating to a right of the actor, compensating to a left of the actor, or passing in front of the actor.

In some non-limiting embodiments or aspects, preventing the conditionally disallowed action comprises removing the conditionally disallowed action from a candidate set of constraints for generating a trajectory, the candidate set of constraints including at least one of: compensating with a movement left of an actor's trajectory while passing ahead of a cross-traffic actor, compensating with a movement right of a trajectory of the actor while passing ahead of the actor in cross-traffic, compensating with a movement right of a trajectory of the actor during an anti-routing movement, or compensating with a movement left of a trajectory of the actor during an anti-routing movement.

In some non-limiting embodiments or aspects, one or more conditions are detected in the roadway when at least one of the AV, the actor, another actor in the roadway, signage in the roadway, traffic lights in the roadway, or an object in the roadway, are associated with a predictable behavior that can result in an action to be avoided, or an action to be performed that is avoided as a result of another action performed.

In some non-limiting embodiments or aspects, detecting that one or more conditions are present in the roadway, further comprises after predicting that the trajectory of the actor is characterized by a cross-traffic movement, detecting a cross-traffic movement of the actor in a lateral direction is greater than a predetermined velocity; detecting the actor is predicted to cross the AV's path or, alternatively sensing that the actor is predicted to come within a predetermined distance of the AV's path; and detecting that a movement of the actor with respect to a lateral component of an actor's speed is greater than a predetermined threshold when compared with a movement of the actor with respect to a longitudinal component of the actor's speed.

In some non-limiting embodiments or aspects, detecting that one or more conditions are present in the roadway, further comprises after predicting that the trajectory of the actor is characterized by an anti-routing movement, detecting the actor is oncoming and is within a predetermined distance of the AV's path; and detecting the actor is moving at a velocity greater than a predetermined speed.

In some non-limiting embodiments or aspects, after detecting the one or more conditions, the method further comprises: deferring a selection of a trajectory until a trajectory associated with a route of the AV has been determined to be fully optimized, and includes optimization for any additional factors in the roadway; and generating a compensating trajectory which provides the AV with an operation to compensate for an actors movement into the AV's lane.

According to non-limiting embodiments or aspects, provided is a system, comprising: a memory; and at least one processor coupled to the memory and configured to: acquire data associated with an actor detected on a route of the AV in the roadway for sensing a trajectory of the actor; predict that the trajectory of the actor includes at least one characteristic that is associated with invoking a conditionally disallowed action in the AV; automatically restrict the conditionally disallowed action from a motion plan of the AV to prevent the AV from executing the conditionally disallowed action in response to detecting that one or more conditions are present in the roadway; and issue a command to control the AV on a candidate trajectory generated to prevent an option for the conditionally disallowed action.

According to non-limiting embodiments or aspects, provided is a non-transitory computer-readable medium having instructions stored thereon that, when executed by at least one computing device, cause the at least one computing device to perform operations comprising: acquiring, by one or more processors of a vehicle computing system, data associated with an actor detected on a route of the AV in the roadway for sensing a trajectory of the actor; predicting, by the one or more processors, that the trajectory of the actor includes at least one characteristic that is associated with invoking a conditionally disallowed action in the AV; automatically restricting, by the one or more processors, the conditionally disallowed action from a motion plan of the AV to prevent the AV from executing the conditionally disallowed action in response to detecting that one or more conditions are present in the roadway; and issuing, by the one or more processors, a command to control the AV on a candidate trajectory generated to prevent an option for the conditionally disallowed action.

Further non-limiting embodiments or aspects are set forth in the following numbered clauses:

Clause 1: A computer-implemented method of controlling an autonomous vehicle (AV) to maneuver in a roadway, comprising: acquiring, by one or more processors of a vehicle computing system, data associated with an actor detected on a route of the AV in the roadway for sensing a trajectory of the actor; predicting, by the one or more processors, that the trajectory of the actor includes at least one characteristic that is associated with invoking a conditionally disallowed action in the AV; automatically restricting, by the one or more processors, the conditionally disallowed action from a motion plan of the AV to prevent the AV from executing the conditionally disallowed action in response to detecting that one or more conditions are present in the roadway; and issuing, by the one or more processors, a command to control the AV on a candidate trajectory generated to prevent an option for the conditionally disallowed action.

Clause 2: The computer-implemented method of clause 1, wherein the data associated with the actor detected on the route of the AV further comprises information for sensing whether the actor traversing the roadway is on a trajectory predetermined to invoke the conditionally disallowed action in the AV.

Clause 3: The computer-implemented method of clauses 1-2, wherein the trajectory of the actor comprises at least one of a cross-ahead movement, a four way stop, a left turn yield, or an anti-routing movement, includes a characteristic associated with invoking the conditionally disallowed action, and wherein the conditionally disallowed action includes compensating to a right of the actor, compensating to a left of the actor, or passing in front of the actor.

Clause 4: The computer-implemented method of clauses 1-3, wherein preventing the conditionally disallowed action comprises removing the conditionally disallowed action from a candidate set of constraints for generating a trajectory, the candidate set of constraints including at least one of: compensating with a movement left of an actor's trajectory while passing ahead of a cross-traffic actor, compensating with a movement right of a trajectory of the actor while passing ahead of the actor in cross-traffic, compensating with a movement right of a trajectory of the actor during an anti-routing movement, or compensating with a movement left of a trajectory of the actor during an anti-routing movement.

Clause 5: The computer-implemented method of clauses 1-4, wherein one or more conditions are detected in the roadway, when at least one of the AV, the actor, another actor in the roadway, signage in the roadway, traffic lights in the roadway, or an object in the roadway, are associated with a predictable behavior that can result in an action to be avoided, or an action to be performed that is avoided as a result of another action performed.

Clause 6: The computer-implemented method of clauses 1-5, wherein detecting that one or more conditions are present in the roadway, further comprises: after predicting that the trajectory of the actor is characterized by a cross-traffic movement: detecting a cross-traffic movement of the actor in a lateral direction is greater than a predetermined velocity; detecting the actor is predicted to cross the AV's path or, alternatively sensing that the actor is predicted to come within a predetermined distance of the AV's path; and detecting that a movement of the actor with respect to a lateral component of an actor's speed is greater than a predetermined threshold when compared with a movement of the actor with respect to a longitudinal component of the actor's speed.

Clause 7: The computer-implemented method of clauses 1-6, wherein detecting that one or more conditions are present in the roadway, further comprises: after predicting that the trajectory of the actor is characterized by an anti-routing movement: detecting the actor is oncoming and is within a predetermined distance of the AV's path; and detecting the actor is moving at a velocity greater than a predetermined speed.

Clause 8: The computer-implemented method of clauses 1-7, wherein, after detecting the one or more conditions, the method further comprises: deferring a selection of a trajectory until a trajectory associated with the route of the AV has been determined to be fully optimized, and includes optimization for any additional factors in the roadway; and generating a compensating trajectory which provides the AV with an operation to compensate for an actors movement into the AV's lane.

Clause 9: A system, comprising: a memory; and at least one processor coupled to the memory and configured to: acquire data associated with an actor detected on a route of the AV in the roadway for sensing a trajectory of the actor; predict that the trajectory of the actor includes at least one characteristic that is associated with invoking a conditionally disallowed action in the AV; automatically restrict the conditionally disallowed action from a motion plan of the AV to prevent the AV from executing the conditionally disallowed action in response to detecting that one or more conditions are present in the roadway; and issue a command to control the AV on a candidate trajectory generated to prevent an option for the conditionally disallowed action.

Clause 10: The system of clause 9, wherein the data associated with the actor detected on the route of the AV further comprises information for sensing whether the actor traversing the roadway is on a trajectory predetermined to invoke the conditionally disallowed action in the AV.

Clause 11: The system of clauses 9-10, wherein the trajectory of the actor comprises at least one of a cross-ahead movement, a four way stop, a left turn yield, or an anti-routing movement, and includes a characteristic associated with invoking the conditionally disallowed action, wherein the conditionally disallowed action includes compensating to a right of the actor, compensating to a left of the actor, or passing in front of the actor.

Clause 12: The system of clauses 9-11, wherein preventing the conditionally disallowed action comprises removing the conditionally disallowed action from a candidate set of constraints for generating a trajectory, the candidate set of constraints including at least one of: compensating with a movement left of an actor's trajectory while passing ahead of a cross-traffic actor, compensating with a movement right of a trajectory of the actor while passing ahead of the actor in cross-traffic, compensating with a movement right of a trajectory of the actor during an anti-routing movement, or compensating with a movement left of a trajectory of the actor during an anti-routing movement.

Clause 13: The system of clauses 9-12, wherein one or more conditions are detected in the roadway, when at least one of the AV, the actor, another actor in the roadway, signage in the roadway, traffic lights in the roadway, or an object in the roadway, are associated with a predictable behavior that can result in an action to be avoided, or an action to be performed that is avoided as a result of another action performed.

Clause 14: The system of clauses 9-13, wherein detecting that one or more conditions are present in the roadway, further comprises predicting that the trajectory of the actor is characterized by a cross-traffic movement, in response to a prediction that the trajectory of the actor is characterized by a cross-traffic movement, the at least one processor is further configure to: detect a cross-traffic movement of the actor in a lateral direction is greater than a predetermined velocity; detect the actor is predicted to cross the AV's path or, alternatively sensing that the actor is predicted to come within a predetermined distance of the AV's path; and detect that a movement of the actor with respect to a lateral component of an actor's speed is greater than a predetermined threshold when compared with a movement of the actor with respect to a longitudinal component of the actor's speed.

Clause 15: The system of clauses 9-14, wherein detecting that one or more conditions are present in the roadway, further comprises predicting that the trajectory of the actor is characterized by an anti-routing movement, in response to a prediction that the trajectory of the actor is characterized by an anti-routing movement, the at least one processor is further configured to: detect the actor is oncoming and is within a predetermined distance of the AV's path; and detect the actor is moving at a velocity greater than a predetermined speed.

Clause 16: The system of clauses 9-15, wherein, after detecting the one or more conditions, the at least one processor is further configured to: defer a selection of a trajectory until a trajectory associated with a route of the AV has been determined to be fully optimized, and includes optimization for any additional factors in the roadway; and generate a compensating trajectory which provides the AV with an operation to compensate for an actors movement into the AV's lane.

Clause 17: A non-transitory computer-readable medium having instructions stored thereon that, when executed by at least one computing device, cause the at least one computing device to perform operations comprising: acquiring, by one or more processors of a vehicle computing system, data associated with an actor detected on a route of the AV in the roadway for sensing a trajectory of the actor; predicting, by the one or more processors, that the trajectory of the actor includes at least one characteristic that is associated with invoking a conditionally disallowed action in the AV; automatically restricting, by the one or more processors, the conditionally disallowed action from a motion plan of the AV to prevent the AV from executing the conditionally disallowed action in response to detecting that one or more conditions are present in the roadway; and issuing, by the one or more processors, a command to control the AV on a candidate trajectory generated to prevent an option for the conditionally disallowed action.

Clause 18: The non-transitory computer-readable medium of clause 17, wherein detecting that one or more conditions are present in the roadway, further comprises instructions, that cause the at least one computing device to predict that the trajectory of the actor is characterized by a cross-traffic movement, and in response to a prediction that the trajectory of the actor is characterized by a cross-traffic movement, cause the at least one computing device to perform operations comprising: detecting a cross-traffic movement of the actor in a lateral direction is greater than a predetermined velocity; detecting the actor is predicted to cross the AV's path or, alternatively sensing that the actor is predicted to come within a predetermined distance of the AV's path; and detecting that a movement of the actor with respect to a lateral component of an actor's speed is greater than a predetermined threshold when compared with a movement of the actor with respect to a longitudinal component of the actor's speed.

Clause 19: The non-transitory computer-readable medium of clauses 17-18, wherein detecting that one or more conditions are present in the roadway, further comprises instructions, that cause the at least one computing device to predict that the trajectory of the actor is characterized by an anti-routing movement, and in response to a prediction that the trajectory of the actor is characterized by an anti-routing movement, cause the at least one computing device to perform operations comprising: detecting the actor is oncoming and is within a predetermined distance of the AV's path; and detecting the actor is moving at a velocity greater than a predetermined speed.

Clause 20: The non-transitory computer-readable medium of clauses 17-19, wherein, after detecting the one or more conditions, instructions to cause the at least one computing device to perform operations, further comprise: deferring a selection of a trajectory until a trajectory associated with a route of the AV has been determined to be fully optimized, and includes optimization for any additional factors in the roadway; and generating a compensating trajectory which provides the AV with an operation to compensate for an actors movement into the AV's lane.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
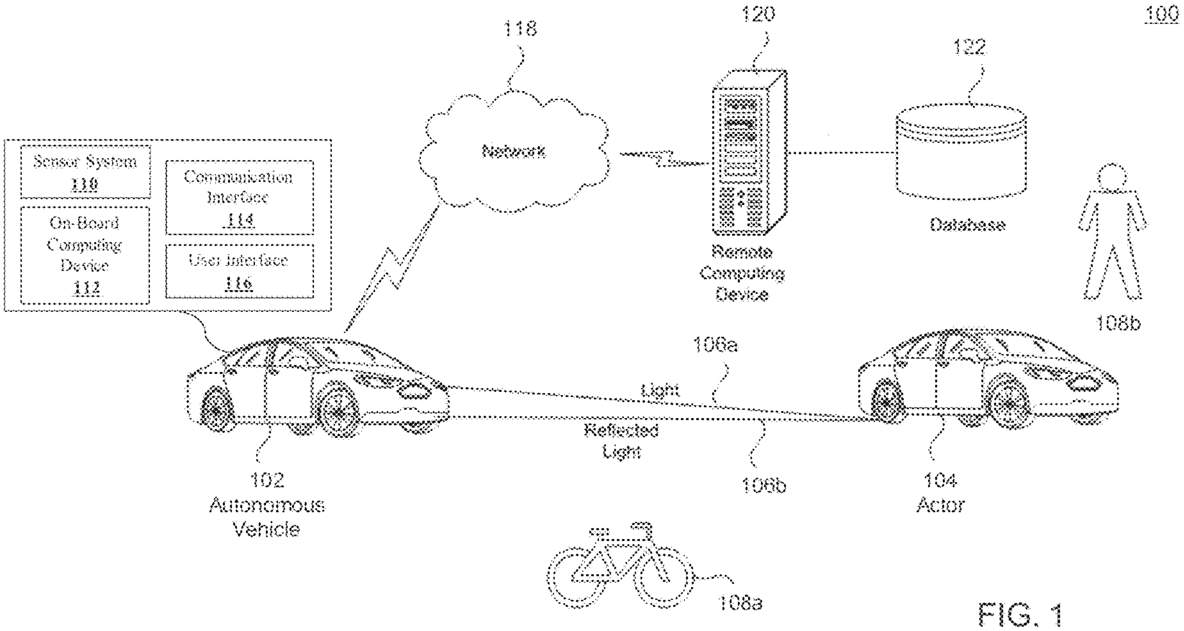
FIG. 1 illustrates non-limiting embodiments or aspects of an exemplary autonomous vehicle system, in accordance with aspects of the present disclosure.

Provided herein are systems, apparatuses, devices, methods, and/or computer program product embodiments, and/or combinations and sub-combinations thereof, for detecting and preventing an autonomous driving operation. It can be difficult to predict when an actor will cross an autonomous vehicle's ("AV") path. For example, an AV may be in a situation where only slight movements by an actor in the roadway can cause large maneuvers of the AV in the roadway to compensate, or alternatively, slight movements by an AV to compensate in response to movement of a first actor can lead to unpredictable actions for other actors in the roadway. This can occur in areas of the roadway where it is difficult to predict movements of other actors in the roadway and where even slight differences between an actual position and a predicted position of an actor in the roadway can substantially change the compensating movement needed by the AV.

An AV includes an electronic memory which stores actions the AV can take, many of which are unconditionally allowed and can be useful to the AV in forming a route. Conditionally disallowed actions can be a benefit in many situations when it is necessary to compensate for maneuvers of a vehicle in an opposing lane, actors moving across a path of an AV, and still others can be useful to handle situational aspects such as cars arriving simultaneously at four way stops, passing cars parked in the roadway, navigating static objects in the roadway, navigating objects that have fallen from other vehicles, and/or the like. The AV uses them in certain situations to adjust a trajectory, and they are very useful and important to forming a route under such conditions.

Provided are improved systems, methods, and computer program products for controlling an AV by acquiring data associated with an actor detected by the AV in the roadway for sensing a trajectory of the actor, predicting that the trajectory of the actor includes at least one characteristic that is associated with invoking a conditionally disallowed action in the AV, automatically restricting the conditionally disallowed action from a motion plan of the AV to prevent the AV from executing the conditionally disallowed action in response to detecting that one or more conditions are present in the roadway, and issuing a command to control the AV on a candidate trajectory generated to prevent an option for the conditionally disallowed action.

In some non-limiting embodiments or aspects, controlling the AV involves motion planning to determine an optimal trajectory from a plurality of trajectories, and evaluate candidate trajectories, to optimize candidate trajectories selected to control the AV by the vehicle computing system. According to the systems, methods, and computer program products described herein, comprehensive and continuous evaluation of actions detects conditionally disallowed actions that may cause unnecessary or undesirable maneuvers that are then prevented.

The conditionally disallowed actions are prevented when they can result in a maneuver that may be difficult or cause the AV to perform in an unexpected manner. In some situations, preventing an action results in only one possible maneuver and, thus, requires no effort in performing calculations to consider multiple maneuvers. Eliminating maneuvers may also provide efficiencies in future motion planning, having a propagating effect as a simplified motion is known to promote future simplified motions, thus further eliminating computationally expensive maneuvers as the initial efficiency propagates through the chain of actions forming the many candidate trajectories for moving the AV to a destination. For example, removing a conditionally disallowed action such as a compensating maneuver for a potentially unpredictable action of another mover in the roadway, can eliminate an action while also creating a more predictable roadway environment.

Objective evaluation of characteristics in the roadway can help to accurately identify when certain conditionally disallowed actions may not be sufficient or efficient for traversing the roadway. Once identified, the condition of the roadway is further evaluated to detect or determine if any conditionally disallowed actions should be prevented. By removing the conditionally disallowed actions, the AV eliminates the need to process these conditionally disallowed actions which lead to more computationally expensive motion planning due to their effect on other movers in the roadway. Preventing conditionally disallowed actions may improve the ability of other actors to predict and respond to the actions of the AV by making the AV behave in a more expected manner, thereby reducing and eliminating computational inefficiencies and/or preventing inconsistent results and further providing runtime efficiency through motion planning with the use of information about the roadway available to the AV to form consistent frameworks for evaluating other movers, handling right of way, eliminating uncertainty considerations, and more efficiently and accurately providing data that is useful for the calculation of other scores.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position, such as, "vertical" and "horizontal", "ahead" and "behind", or "front" and "rear", when used, are intended to be relative to each other and need not be absolute and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms, such as, "first" and "second" are used to modify a noun, such use is simply intended to distinguish one item from another and is not intended to require a sequential order unless specifically stated.

In some non-limiting embodiments or aspects, one or more aspects may be described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device", "electronic device", or "computer" may refer to one or more electronic devices configured to process data. A computing device may, in some examples, include the necessary components to receive, process, and output data, such as, a processor, a display, a memory, an input device, a network interface, and/or the like. A computing device may be included in a device on-board an autonomous vehicle (AV). As an example, a computing device may include an on-board specialized computer (e.g., a sensor, a controller, a data store, a communication interface, a display interface, etc.), a mobile device (e.g., a smartphone, standard cellular phone, or integrated cellular device), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client", "client device", and "remote device" may refer to one or more computing devices that access a service made available by a server. In some non-limiting embodiments or aspects, a "client device" may refer to one or more devices that facilitate a maneuver by an AV, such as, one or more remote devices communicating with an AV. In some non-limiting embodiments or aspects, a client device may include a computing device configured to communicate with one or more networks and/or facilitate vehicle movement, such as, but not limited to, one or more vehicle computers, one or more mobile devices, and/or other like devices.

As used herein, the term “server” may refer to or include one or more computing devices that are operated by or facilitate communication and processing for multiple parties in a network environment, such as, the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a “system.” The terms “processor” and “processing device” refer to a hardware component of an electronic device that is configured to execute programming instructions. Except where specifically stated otherwise, the singular term “processor” or “processing device” is intended to include both single-processing device embodiments and embodiments in which multiple processing devices together or collectively perform a process. Reference to “a server” or “a processor,” as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term “system” may refer to one or more computing devices or combinations of computing devices, such as, but not limited to, processors, servers, client devices, sensors, software applications, and/or other like components. In addition, reference to “a server” or “a processor,” as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function. The terms “memory,” “memory device,” “data store,” “data storage facility,” and the like each refer to a non-transitory device on which computer-readable data, programming instructions, or both are stored. Except where specifically stated otherwise, the terms “memory,” “memory device,” “data store,” “data storage facility,” and the like are intended to include single device embodiments, embodiments in which multiple memory devices together or collectively store a set of data or instructions, as well as, individual sectors within such devices.

According to some embodiments, the term “vehicle” refers to any moving form of conveyance that is capable of carrying either one or more human occupants and/or cargo and is powered by any form of energy. The term “vehicle” includes, but is not limited to, cars, trucks, vans, trains, autonomous vehicles, aircraft, aerial drones, and the like. An “autonomous vehicle” (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle’s autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms “trajectory” and “trajectories” may refer to a path (e.g., a path through a geospatial area, etc.) with positions of the AV along the path with respect to time, where a “path” generally implies a lack of temporal information, one or more paths for navigating an AV in a roadway for controlling travel of the AV on the roadway. A trajectory may be associated with a map of a geographic area including the roadway. In such an example, the path may traverse a roadway, an intersection, an other connection or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, “map data” and “sensor data” includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some embodiments, a map of a geographic location includes one or more routes (e.g., a nominal route, a driving route, etc.) that include one or more roadways. According to some non-limiting embodiments or aspects, map data associated with a map of the geographic location associates the one or more roadways with an indication of whether an AV can travel on that roadway. As used herein, “sensor data” includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle in one or more roadways) of a number of points (e.g., a point cloud) that correspond to objects that have reflected a ranging laser of one or more mapping vehicles at the geographic location (e.g. an object such as a vehicle, bicycle, pedestrian, etc. in the roadway). As an example, sensor data may include LiDAR point cloud data that represents objects in the roadway, such as, other vehicles, pedestrians, cones, debris, and/or the like.

As used herein, a “road” refers to a paved or an otherwise improved path between two places that allows for travel by a vehicle (e.g., autonomous vehicle (AV)). Additionally or alternatively, a road includes a roadway and a sidewalk in proximity to (e.g., adjacent, near, next to, abutting, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle, or other vehicle may travel, such as, a crosswalk, a bicycle lane (e.g., a lane in which a bicycle travels), a mass transit lane (e.g., a lane in which a bus may travel), and/or the like. According to some non-limiting embodiments, a roadway is connected to another roadway to form a road network, for example, a lane of a roadway is connected to another lane of the roadway and/or a lane of the roadway is connected to a lane of another roadway. In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network and may include any number of maneuvers or an evaluation of any number of maneuvers (e.g., a simple maneuver, a complex maneuver, etc.), such as, a maneuver involving certain driving conditions, such as, dense traffic, where successfully completing a lane change may require a complex maneuver, like speeding up, slowing down, stopping, or abruptly turning, for example, to steer into an open space between vehicles, pedestrians, or other objects (as detailed herein) in a destination lane. Additionally, in-lane maneuvers may also involve an evaluation of any number of maneuvers, such as, a maneuver to traverse a lane split, an intersection (e.g., a three-leg, a four-leg, a multileg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as, a maneuver based on a current traffic speed of objects in the roadway, a current traffic direction (e.g., anti-routing traffic, wrong-way driving, or counter flow driving, where a vehicle is driving against the direction of traffic and/or against the legal flow of traffic), current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as, a maneuver to avoid an object in proximity to a road, such as, structures (e.g., a building, a rest stop, a toll booth, a bridge, etc.), traffic control objects (e.g., lane markings, traffic signs, traffic lights, lampposts, curbs of the road, gully, a pipeline, an aqueduct, a speedbump, a speed depression, etc.), a lane of a roadway (e.g., a parking lane, a turning lane, a bicycle lane, etc.), a crosswalk, a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

FIG. 1 provides a system 100 in which devices, systems, and/or methods, herein, may be implemented. System 100 comprises an autonomous vehicle 102 ("AV 102") that is traveling along a road in a semi-autonomous or autonomous manner. AV 102 is also referred to herein as vehicle 102. AV 102 can include, but is not limited to, a land vehicle (as shown in FIG. 1), an aircraft, or a watercraft.

AV 102 is generally configured to detect objects in the roadway, such as 104, 108*a*, and 108*b* in proximity thereto. The objects can include, but are not limited to, a vehicle, such as actor 104, bicyclist 108*a* (e.g., a rider of a bicycle, an electric scooter, a motorcycle, or the like) and/or a pedestrian 108*b*. Actor 104 may be an autonomous vehicle, semi-autonomous vehicle, or alternatively, a non-autonomous vehicle controlled by a driver.

As illustrated in FIG. 1, AV 102 may include sensor system 110, on-board computing device 112, communications interface 114, and user interface 116. AV 102 may further include certain components (as illustrated, for example, in FIG. 2) included in vehicles, which may be controlled by on-board computing device 112 using a variety of communication signals and/or commands, such as, for example, acceleration signals or commands, deceleration signals or commands, steering signals or commands, braking signals or commands, etc.

Figure 2:
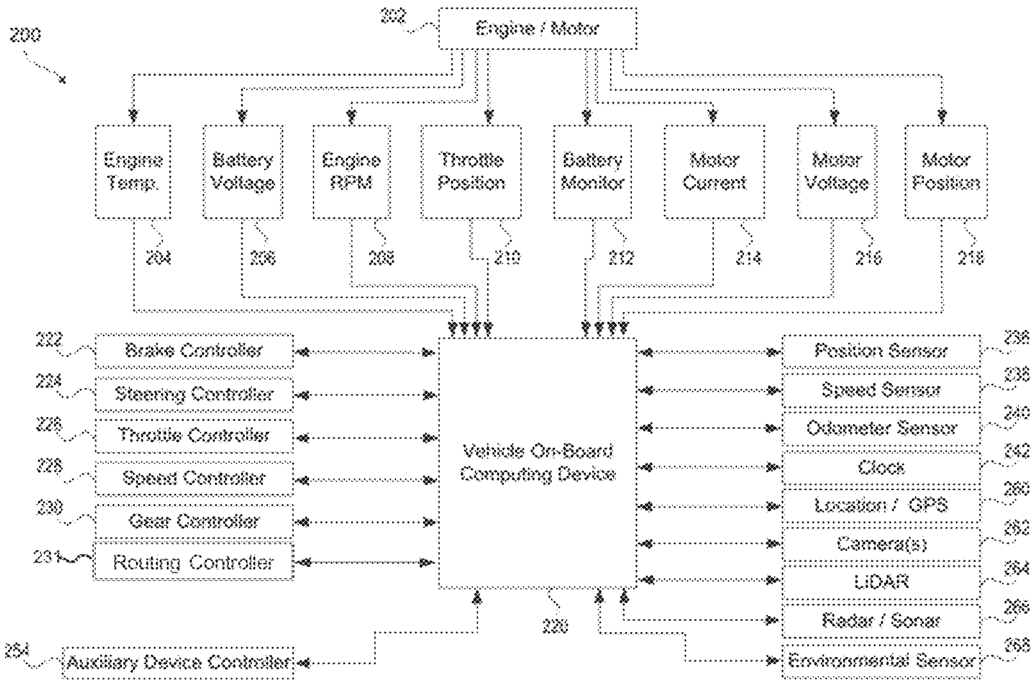
FIG. 2 provides a diagram of non-limiting embodiments or aspects of an exemplary architecture for a vehicle in which detecting and preventing an autonomous driving operation, as described herein, may be implemented.

Sensor system 110 may include one or more sensors that are coupled to and/or are included within AV 102, as illustrated in FIG. 2. For example, such sensors may include, without limitation, a laser detection and ranging (LiDAR) system, a radio detection and ranging (RADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of AV 102, information about the environment itself, information about the motion of AV 102, information about a route of AV 102, and/or the like. As AV 102 moves over a surface, at least some of the sensors may collect data pertaining to the surface.

As will be described in greater detail, AV 102 may be configured with a LiDAR system (e.g., LiDAR system 264 of FIG. 2.) The LiDAR system may be configured to transmit light pulse 106*a* to detect objects located within a distance or range of distances of AV 102. Light pulse 106*a* may be incident on one or more objects (e.g., actor 104, cyclist 108*a*, pedestrian 108*b*) and be reflected back to the LiDAR system. Reflected light pulse 106*b* incident on the LiDAR system may be processed to determine a distance of that object to AV 102. The reflected light pulse may be detected using, in some embodiments, a photodetector or array of photodetectors positioned and configured to receive the light reflected back into the LiDAR system. LiDAR information, such as detected object data, is communicated from the LiDAR system to on-board computing device 112 (e.g., vehicle on-board computing device 220 of FIG. 2, etc.). AV 102 may also communicate LiDAR data to remote computing device 120 (e.g., cloud processing system) over communications network 118. Remote computing device 120 may be configured with one or more servers to process one or more processes of the technology described herein. Remote computing device 120 may also be configured to communicate data/instructions to/from AV 102 over network 118, to/from server(s) and/or database(s) 122.

It should be noted that the LiDAR systems for collecting data pertaining to the surface may be included in systems other than AV 102 such as, without limitation, other vehicles (autonomous or driven), robots, satellites, etc.

Network 118 may include one or more wired or wireless networks. For example, network 118 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 118 from database 122. Database 122 may be configured to store and supply raw data, indexed data, structured data, map data, program instructions or other configurations as is known.

Communications interface 114 may be configured to allow communication between AV 102 and external systems, such as, for example, external devices, sensors, other vehicles, servers, data stores, databases, and/or the like. Communications interface 114 may utilize any now or hereafter known protocols, protection schemes, encodings, formats, packaging, etc. such as, without limitation, Wi-Fi, an infrared link, Bluetooth, etc. User interface system 116 may be part of peripheral devices implemented within AV 102 including, for example, a keyboard, a touch screen display device, a microphone, and a speaker, etc.

In some non-limiting embodiments or aspects, AV 102 evaluates routes and generates multiple candidate trajectories at a time using a score, and in some examples, performs a rank of a trajectory (e.g., in terms of comfort, time, distance, etc.), to follow.

In some examples, generating candidate trajectories involves a motion planning task to generate constraint sets that are composed of possible actions (e.g., maneuvers for navigating constraints, etc.), for each object. Each of these constraint sets may define a sequence of actions to be taken over particular time intervals. For instance, an action could involve AV 102 staying ahead of actor 104 from 4-6 seconds in the future. A constraint may involve AV 102 staying behind an actor 104 from 0-2 seconds in the future, passing it from 2-4 seconds in the future, and staying ahead of it from 4-6 seconds in the future. A candidate trajectory is then generated for each constraint set. In such an example, constraints are used by an optimization routine to compute each trajectory.

In some examples, AV 102 may perform monitoring and checking to determine a time at which a path is expected to intersect another object's trajectory. On-board computing device 112 can monitor and/or check paths by generating convex hulls for AV 102 with predicted poses formed over a sampling of time intervals for managing AV 102 while traversing actor 104. Geometric intersection checks may then be computed from the convex hulls by finding intersection points between AV 102 and actor 104 using the convex hulls at each time interval. Convex hulls are able to identify collisions between fast moving actors and ensure they are not omitted without requiring a very dense temporal sampling.

In one example, AV 102 while traversing a roadway, moving from behind actor 104 (e.g., a parked vehicle, a stationary object, etc.), overtakes actor 104 and crosses a path of pedestrian **108*b*. In such an example, multiple constraint sets may be found to traverse the roadway. As an example, a first candidate trajectory may be configured to stop AV 102 for actor 104, a second trajectory may be configured to manage AV 102 to pass behind when pedestrian 108*b* is predicted to be present and/or crossing a path ahead of AV 102, such as moving in a lane on the path of AV 102 on a trajectory (e.g., a pedestrian trajectory, a bicyclist trajectory, etc.), and a final trajectory may include a constraint for moving left or right in anticipation of the pedestrian, before pedestrian 108*b* is traversing the AV lane on pedestrian trajectory. Based on the final candidate trajectory, AV 102 selects a trajectory to perform a movement for compensating around actor 104**, causing a final trajectory that compensates for a pedestrian trajectory by moving off of the reference path (RP).

In some non-limiting embodiments or aspects, controlling AV 102 includes on-board computing device 112 for processing a motion plan to generate, select, or optimize a trajectory from a plurality of trajectories, for example, by correlating a potential rank or score of each candidate trajectory. In such an example, an optimized candidate trajectory is selected based on the rank or score, to control AV 102, by a subsystem of the vehicle computing system. Objective evaluation of candidate trajectories based on maneuvers in relation to the predictions about other objects reduces and eliminates computational inefficiencies and inconsistent results and further increases runtime efficiency by eliminating unnecessary compensating maneuvers.

FIG. 2 illustrates an exemplary system architecture 200 for a vehicle, in accordance with aspects of the disclosure. Vehicles 102 (or 104) of FIG. 1 can have the same or similar system architecture as that shown in FIG. 2. Thus, the following discussion of system architecture 200 is sufficient for understanding vehicle(s) 102 and 104 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, a system architecture 200 of AV 102 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage, and/or temperature of the battery), motor current 214 and motor voltage 216 sensors, and motor position sensors 218 such as resolvers and encoders.

Operational parameter sensors that are common to both types of vehicles include, for example: position sensor 236 such as an accelerometer, gyroscope, and/or inertial measurement unit; speed sensor 238; and odometer sensor 240. The vehicle also may have clock 242 that the system uses to determine vehicle time during operation. Clock 242 may be encoded into a vehicle on-board computing device 220, it may be a separate device, or multiple clocks may be available.

The vehicle also includes various sensors that operate to gather information about the environment in which the vehicle is traveling. These sensors may include, for example: location sensor 260 (e.g., a Global Positioning System ("GPS") device); object detection sensors such as one or more cameras 262; LiDAR system 264; and/or radar and/or sonar system 266. The sensors also may include environmental sensors 268 such as a precipitation sensor and/or ambient temperature sensor. The object detection sensors may enable the vehicle to detect objects that are within a given distance range of the vehicle (e.g., AV 102) in any direction, while the environmental sensors collect data about environmental conditions within the vehicle's area of travel.

During operations, information is communicated from the sensors to vehicle on-board computing device 220. Vehicle on-board computing device 220 is implemented using the computer system of FIG. 8. Vehicle on-board computing device 220 analyzes the data captured by the sensors and optionally controls operations of the vehicle based on results of the analysis. For example, vehicle on-board computing device 220 may control one or more of: braking via brake controller 222; direction via steering controller 224; speed and acceleration via throttle controller 226 (in a gas-powered vehicle) or motor speed controller 228 (such as a current level controller in an electric vehicle); differential gear controller 230 (in vehicles with transmissions); other controllers, and/or the like. Auxiliary device controller 254 may be configured to control one or more auxiliary devices, such as testing systems, auxiliary sensors, mobile devices transported by the vehicle, and/or the like.

Geographic location information may be communicated from location sensor 260 to vehicle on-board computing device 220, which may then access a map of the environment that corresponds to the location information to determine known fixed features of the environment such as streets, buildings, stop signs and/or stop/go signals. Captured images from cameras 262 and/or object detection information captured from sensors such as LiDAR system 264 is communicated from those sensors to vehicle on-board computing device 220. The object detection information and/or captured images are processed by vehicle on-board computing device 220 to detect objects in proximity to AV 102. Any known or to be known technique for making an object detection based on sensor data and/or captured images can be used in the embodiments disclosed in this document.

LiDAR information is communicated from LiDAR system 264 to vehicle on-board computing device 220. Additionally, captured images are communicated from camera(s) 262 to vehicle on-board computing device 220. The LiDAR information and/or captured images are processed by vehicle on-board computing device 220 to detect objects in proximity to AV 102. The manner in which the object detections are made by vehicle on-board computing device 220 includes such capabilities detailed in this disclosure.

Vehicle on-board computing device 220 may include and/or may be in communication with routing controller 231 that generates a navigation route from a start position to a destination position for an autonomous vehicle. Routing controller 231 may access a map data store to identify possible routes and road segments that a vehicle can travel on to get from the start position to the destination position. Routing controller 231 may score the possible routes and identify a preferred route to reach the destination. For example, routing controller 231 may generate a navigation route that minimizes Euclidean distance traveled or other cost function during the route and may further access the traffic information and/or estimates that can affect an amount of time it will take to travel on a particular route. Depending on implementation, routing controller 231 may generate one or more routes using various routing methods, such as Dijkstra's algorithm, Bellman-Ford algorithm, or other algorithms. Routing controller 231 may also use the traffic information to generate a navigation route that reflects expected conditions of the route (e.g., current day of the week or current time of day, etc.), such that a route generated for travel during rush-hour may differ from a route generated for travel late at night. Routing controller 231 may also generate more than one navigation route to a destination and send more than one of these navigation routes to a user for selection by the user from among various possible routes.

In various embodiments, the vehicle on-board computing device 220 may determine perception information of the surrounding environment of AV 102. Based on the sensor data provided by one or more sensors and location information that is obtained, vehicle on-board computing device 220 may determine perception information of the surrounding environment of AV 102. The perception information may represent what an ordinary driver would perceive in the surrounding environment of a vehicle. The perception data may include information relating to one or more objects in the environment of AV 102. For example, vehicle on-board computing device 220 may process sensor data (e.g., LiDAR or RADAR data, camera images, etc.) in order to identify objects and/or features in the environment of AV 102. The objects may include traffic signals, road way boundaries, other vehicles, pedestrians, and/or obstacles, etc. Vehicle on-board computing device 220 may use any now or hereafter known object recognition algorithms, video tracking algorithms, and computer vision algorithms (e.g., track objects frame-to-frame iteratively over a number of time periods) to determine the perception.

In some embodiments, vehicle on-board computing device 220 may also determine, for one or more identified objects in the environment, the current state of the object. The state information may include, without limitation, for each object: current location; current speed and/or acceleration; current heading; current pose; current shape, size, or footprint; type (e.g., vehicle vs. pedestrian vs. bicycle vs. static object or obstacle); and/or other state information.

Vehicle on-board computing device 220 may perform one or more prediction and/or forecasting operations. For example, vehicle on-board computing device 220 may predict future locations, trajectories, and/or actions of one or more objects. For example, vehicle on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, AV 102, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, vehicle on-board computing device 220 may also predict whether the vehicle may have to fully stop prior to entering the intersection.

In various embodiments, vehicle on-board computing device 220 may determine a motion plan for the autonomous vehicle. For example, vehicle on-board computing device 220 may determine a motion plan for the autonomous vehicle based on the perception data and/or the prediction data. Specifically, given predictions about the future locations of proximate objects and other perception data, vehicle on-board computing device 220 can determine a motion plan for AV 102 that best navigates the autonomous vehicle relative to the objects at their future locations.

In some embodiments, vehicle on-board computing device 220 may receive predictions and make a decision regarding how to handle objects and/or actors in the environment of AV 102. For example, for a particular actor (e.g., a vehicle with a given speed, direction, turning angle, etc.), vehicle on-board computing device 220 decides whether to overtake, yield, stop, and/or pass based on, for example, traffic conditions, map data, state of the autonomous vehicle, etc. Furthermore, vehicle on-board computing device 220 also plans a path for AV 102 to travel on a given route, as well as driving parameters (e.g., distance, speed, and/or turning angle). That is, for a given object, vehicle on-board computing device 220 decides what to do with the object and determines how to do it. For example, for a given object, vehicle on-board computing device 220 may decide to pass the object and may determine whether to pass on the left side or right side of the object (including motion parameters such as speed). Vehicle on-board computing device 220 may also assess the risk of a collision between a detected object and AV 102. If the risk exceeds an acceptable threshold, it may determine whether the collision can be avoided if the autonomous vehicle follows a defined vehicle trajectory and/or implements one or more dynamically generated emergency maneuvers performed in a pre-defined time period (e.g., N milliseconds). If the collision can be avoided, then vehicle on-board computing device 220 may execute one or more control instructions to perform a cautious maneuver (e.g., mildly slow down, accelerate, change lane, or swerve). In contrast, if the collision cannot be avoided, then vehicle on-board computing device 220 may execute one or more control instructions for execution of an emergency maneuver (e.g., brake and/or change direction of travel).

As discussed above, planning and control data related to maneuvering the autonomous vehicle in the roadway is generated for execution. Vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
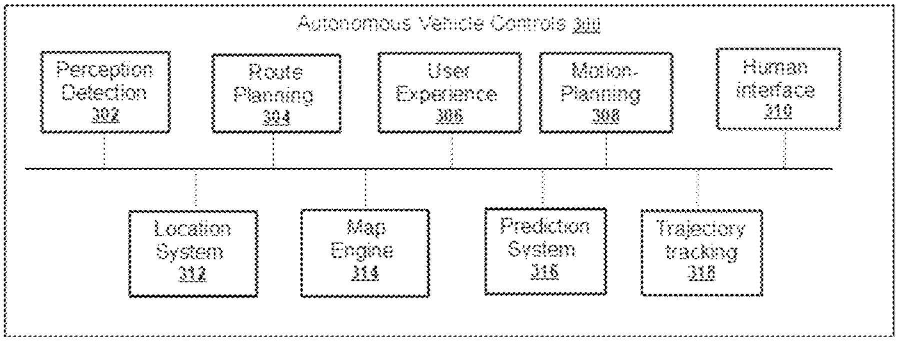
FIG. 3 provides a diagram of non-limiting embodiments or aspects of autonomous vehicle controls in which detecting and preventing an autonomous driving operation, as described herein, may be implemented.

FIG. 3 illustrates an exemplary vehicle control system 300, in which devices, systems, and/or methods, described herein, may be implemented. Vehicle control system 300 may interconnect (e.g., establish a connection to communicate and/or the like) with on-board computing device 112, sensor system 110, user interface 116, or via communication interface 114 to remote data and processing systems (e.g., sources, computing devices, external computing systems, etc.) of database 122 (e.g., data store(s), etc.) and remote computing device 120 (e.g., central server(s), etc.), for example, vehicle control system 300 may utilize wired connections and/or wireless connections to provide an input or output exchange with local vehicle systems (e.g., one or more systems of AV 102, etc.).

With continued reference to FIG. 3, vehicle control system 300 may, additionally or alternatively, communicate with components (e.g., shown in FIG. 2, etc.), such as, an engine, wheels, steering wheel, transmission, etc., which may be controlled, using a variety of communication signals and/or commands, such as, for example, acceleration signals or commands, deceleration signals or commands, steering signals or commands, braking signals or commands, and/or the like.

In some non-limiting embodiments or aspects, vehicle control system 300 includes components for autonomous operation of AV 102 to store or retrieve (e.g., request, receive, etc.) vehicle information from one or more data stores and/or one or more central servers. For example, vehicle control system 300 may synchronize (e.g., update, change, etc.) data, interfaces, map data, and/or the like as AV 102 is traversing a roadway. Multiple AVs may be coupled to each other and/or coupled to data stores, to central servers, or to one another.

With continued reference to FIG. 3, vehicle control system 300 may receive data and provide instructions from one or more components comprising perception detection 302, location system 312, route planning 304, map engine 314, user experience 306, prediction system 316, motion planning 308, trajectory tracking 318, and human interface 310.

Location system 312 may obtain and/or retrieve map data (e.g., map information, one or more submaps, one or more maps for a geographic area, etc.) from map engine 314 which provides detailed information about a surrounding environment of the autonomous vehicle. Location system 312 may obtain detailed information about the surrounding environment of the autonomous vehicle. The map data can provide information regarding: the identity or location of different roadways, road segments, buildings, trees, signs, or other objects; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data (as described above) that provides information and assists AV 102 in analyzing a surrounding environment of the autonomous vehicle. In some non-limiting embodiments or aspects, map data may also include reference path information corresponding to common patterns of vehicle travel along one or more lanes such that a motion of an object is constrained to the reference path (e.g., locations within traffic lanes on which an object commonly travels). Such reference paths may be pre-defined, such as, the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 312 may also include and/or may receive information relating to a trip or route of a user, real-time traffic information on the route, and/or the like.

Location system 312 may also comprise and/or may communicate with route planning 304 for generating an AV navigation route from a start position to a destination position for AV cloud system. Route planning 304 may access map engine 314 (e.g., a central map data store stored in data pipeline) to identify possible routes and road segments where a vehicle may travel, to travel from a start position to a destination position. Route planning 304 may score the possible routes and identify a preferred route to reach the destination. For example, route planning 304 may generate a navigation route that minimizes a distance traveled or other cost function while traversing the route and may further access the traffic information and/or estimates that can affect an amount of time it will take to travel on a particular route. Depending on implementation, route planning 304 may generate one or more routes using various routing methods, such as, Dijkstra's algorithm, Bellman-Ford's algorithm, and/or the like. Route planning 304 may also use the traffic information to generate a navigation route which reflects an expected experience or condition of the route (e.g., current day of the week or current time of day, etc.), such that a route generated for travel during rush-hour may differ from a route generated for travel late at night. Route planning 304 may also generate more than one navigation route to a destination and send more than one of these navigation routes to user experience 306 for interfacing with a user (e.g., on a tablet, a mobile device, a vehicle device, etc.) for selection by a user from among various possible routes.

Perception detection 302 may detect information of the surrounding environment of AV 102 during travel from the start position to the destination along the preferred route, perception detection 302 may detect objects or other roadway characteristics based on sensor data provided by sensors as shown and described with respect to FIG. 2, and information obtained by location system 312. The perception information represents what an ordinary driver perceives in the surrounding environment of a vehicle. The perception data may include information relating to one or more objects in the environment of the autonomous vehicle. For example, prediction system 316 may process sensor data (e.g., from LiDAR, RADAR, camera images, etc.) in order to identify objects and/or features in and around the geospatial area of the autonomous vehicle. Detected objects may include traffic signals, roadway boundaries, vehicles, pedestrians, obstacles in the roadway, and/or the like. Perception detection 302 may use known object recognition and detection algorithms, video tracking algorithms, or computer vision algorithms (e.g., tracking objects frame-to-frame iteratively over a number of time periods, etc.) to perceive an environment of AV 102.

In some non-limiting embodiments or aspects, perception detection 302 may also determine, for one or more identified objects in the environment, a current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 316 may predict the future locations, trajectories, and/or actions of such objects perceived in the environment, based at least in part on perception information (e.g., the state data for each object) received from perception detection 302, the location information received from location system 312, sensor data, and/or any other data related to a past and/or current state of an object, the autonomous vehicle, the surrounding environment, and/or relationship(s). For example, if an object is a vehicle and the current driving environment includes an intersection, prediction system 316 may predict whether the object will likely move straight forward or make a movement into a turn, in a direction of a crossing lane, and/or the like. If the perception data indicates that the intersection has no traffic light, prediction system 316 may also predict whether the vehicle may fully stop prior to entering the intersection. Such predictions may be made for a given time horizon (e.g., 5 seconds in the future). In certain embodiments, prediction system 316 may provide the predicted trajectory or trajectories for each object to motion planning 308.

Motion planning 308 determines a motion plan for AV 102 based on the perception data, prediction data, sensor data, location data, map data, and/or the like. Specifically, given predictions about the future locations of proximate objects and other perception data, motion planning 308 can determine a motion plan (e.g., a trajectory, candidate trajectories, etc.) for autonomously navigating a route relative to one or more objects in their present and future locations.

In some examples, motion planning 308 may receive one or more predictions from prediction system 316 and make a decision regarding how to handle one or more objects in the environment surrounding AV 102. For a particular object (e.g., a vehicle with a given speed, direction, turning angle, etc.), motion planning 308 determines whether to overtake, yield, stop, and/or pass, based on, for example, traffic conditions, location, state of the autonomous vehicle, and/or the like. In some non-limiting embodiments or aspects, for a given object, motion planning 308 may decide a course to handle the object and may determine one or more actions for responding to the presence of the object. For example, for a given object, motion planning 308 may decide to pass the object and then may determine whether to pass on the left side or the right side of the object (including motion parameters, such as, speed and lane change decisions). Motion planning 308, in connection with trajectory tracking 318, may also assess a relationship between a detected object and AV 102 before determining a trajectory. Depending on the relationship (e.g., an assessment within an acceptable threshold, etc.), AV 102 may determine to avoid an object by navigating a defined vehicle trajectory and/or implementing one or more dynamically generated maneuvers performed in a pre-defined time period (e.g., N milliseconds) to compensate for the objects predicted motion. In some examples, vehicle control system 300 are used to generate appropriate control instructions for executing a maneuver (e.g., mildly slow down, accelerate, change lane, turn, etc.). In contrast, depending on a location of an object (e.g. a pose of the object in the roadway, etc.), AV 102 may be controlled to stop or change direction of travel.

Trajectory tracking 318 observes a trajectory (e.g., trajectory generation) for an autonomous vehicle while AV 102 is traversing a pre-defined route (e.g., a nominal route generated by route planning 304, etc.). The trajectory specifies a path for the autonomous vehicle, as well as, a velocity profile. AV 102 converts the trajectory into control instructions for AV 102, including but not limited to throttle/brake and steering wheel angle commands for the controls shown in FIG. 2. Trajectory generation includes decisions relating to lane changes, such as, without limitation, whether a lane change is required, where to perform a lane change, and when to perform a lane change. Specifically, one objective of motion planning 308 is to generate a trajectory for motion of the vehicle from a start position to a destination on the nominal route, taking into account the perception and prediction data.

Motion planning 308 may generate a trajectory by performing topological planning to generate a set of constraints for each of a plurality of topologically distinct classes of trajectories, optimizing a single candidate trajectory for each class, and/or scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects, such as, traffic cones and bollards, or other road users, such as, pedestrians, cyclists, and cars (e.g., moving cars, parked cars, double parked cars, etc.). Restricted map areas may include, for example, crosswalks and intersections. Discrete actions may include, for example, to stop before or proceed, to track ahead or behind, to pass on the left or right of an object, and/or the like.

Motion planning 308 determines or generates planning and control data regarding the autonomous vehicle that is transmitted to vehicle control system, such as on-board computing device 112, or routing controller 231 for execution. AV 102, for example, utilizes a motion plan to control braking via a brake controller; direction via a steering controller; speed and acceleration via a throttle controller (in a gas-powered vehicle); or a motor speed controller (such as, a current level controller in an electric vehicle); a differential gear controller (in vehicles with transmissions); and/or other controls.

In the various embodiments discussed in this document, the description may state that the vehicle or a controller included in the vehicle may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

Figure 4:
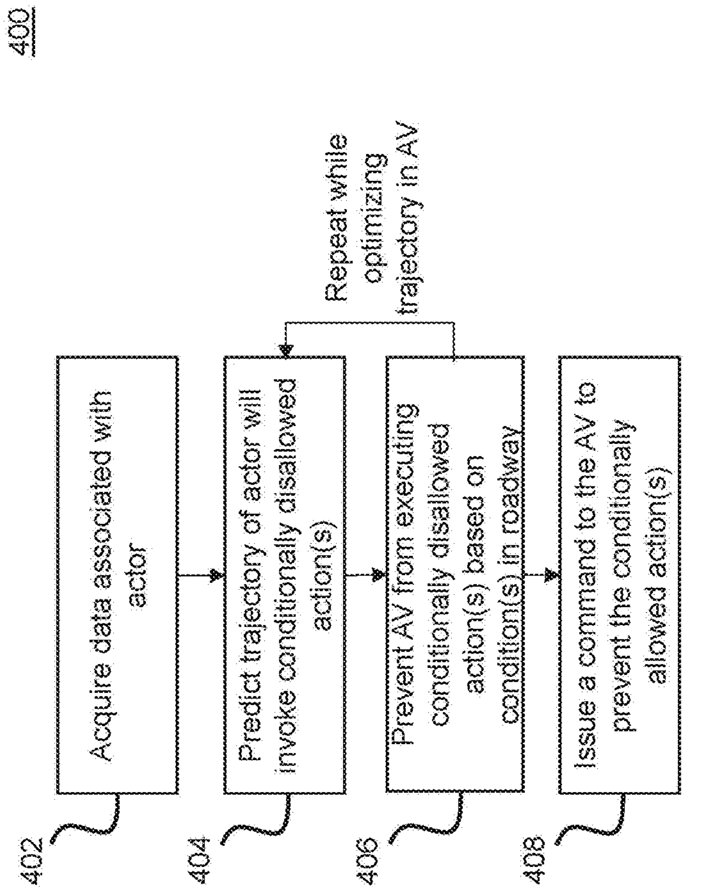
FIG. 4 provides a flowchart illustrating a non-limiting embodiment or aspect of a method for detecting and preventing an autonomous driving operation, according to the principles of the present disclosure.

FIG. 4 illustrates a flowchart of a non-limiting embodiment or aspect of process 400 for detecting and preventing an autonomous vehicle operation in autonomous vehicle systems (e.g., self-driving systems of FIGS. 1 and 2, an autonomy stack of FIG. 3, etc.). In some non-limiting embodiments or aspects, one or more of the steps of process 400 are for detecting and preventing an autonomous vehicle operation that are performed (e.g., completely, partially, and/or the like) by AV 102 (e.g., on-board computing device 112, one or more devices of AV 102, information generated from and/or received from AV 102, etc.). In some non-limiting embodiments or aspects, one or more of the steps of process 400 may be performed (e.g., completely, partially, and/or the like) by one or more components of vehicle control system 300 of FIG. 3, one or more processors of a self-driving system of AV 102, or based on information received from autonomy systems (e.g., data related to an on-board autonomous vehicle system, data related to an on-board autonomous vehicle service provider, data related to a device of on-board autonomous vehicle system, data about an on-board vehicle service, data related to an on-board vehicle controller or software program, data related to a sensor of an on-board vehicle system, and/or the like.

As shown in FIG. 4, at step 402, process 400 may include acquiring data associated with actor 104. In some non-limiting embodiments or aspects, for example, AV 102 (e.g., on-board computing device 112, one or more processors of on-board computing device 112) acquires data associated with an actor detected on a route of the AV in the roadway for sensing a trajectory of the actor.

In some non-limiting embodiments or aspects, on-board computing device 112 acquires data associated with the actor detected on a route of the AV. For example, sensor system 110 senses information in the roadway and detects a trajectory of actor 104. After detecting a trajectory, on-board computing device 112 determines whether the actor traversing the roadway is on a trajectory predetermined to invoke the conditionally disallowed action in the AV. For example, on-board computing device 112 may acquire data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. On-board computing device 112 also acquires information related to a map of a geographic location of AV 102 that includes one or more routes (e.g., a nominal route, a driving route, etc.) through one or more roadways. According to some non-limiting embodiments or aspects, map data related to a map of the geographic location associates the one or more roadways with an indication of whether and where AV 102 can travel on that roadway.

In some non-limiting embodiments or aspects, on-board computing device 112 acquires data from one or more sensors. For example, on-board computing device 112 may acquire sensor data that includes light detection and ranging (LiDAR) point cloud maps (e.g., map point data, etc.) associated with a geographic location (e.g., a location in three-dimensional space relative to the LiDAR system of a mapping vehicle in one or more roadways) of a number of points (e.g., a point cloud) that correspond to objects in the roadway while AV 102 is traversing a route, that have reflected a ranging laser (e.g. an object such as actor 104, bicyclist 108*a*, pedestrian 108*b*, and/or the like, in the roadway). As an example, sensor data may include LiDAR point cloud data that represents objects in the roadway, such as, actor 104, other vehicles, bicyclist 108*a*, pedestrian 108*b*, cones, debris, and/or the like.

As shown in FIG. 4, at step 404, process 400 may include predicting a trajectory of actor 104 which invokes a conditionally disallowed action. In some non-limiting embodiments or aspects, for example, on-board computing device 112 predicts that the trajectory of the actor includes at least one characteristic that is associated with invoking a conditionally disallowed action in the AV.

In some non-limiting embodiments or aspects, on-board computing device 112 predicts a trajectory of actor 104 that comprises at least one of a cross-ahead, a four way stop, a left turn yield, or an anti-routing path. On-board computing device 112 detects a characteristic based on the prediction. On-board computing device 112 determines if a characteristic of the predicted trajectory is associated with invoking a conditionally disallowed action, such as, for example a conditionally disallowed action that includes at least one of compensating to a right of the actor, compensating to a left of the actor, or passing in front of the actor, and/or the like.

Figure 5:
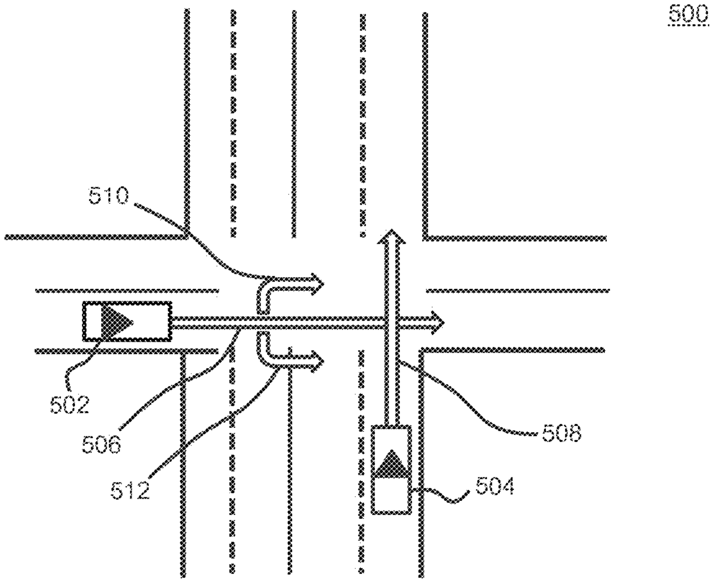
FIG. 5 illustrates non-limiting embodiments or aspects of a roadway environment in which systems, apparatuses, and/or methods, as described herein, may be implemented.
Figure 6:
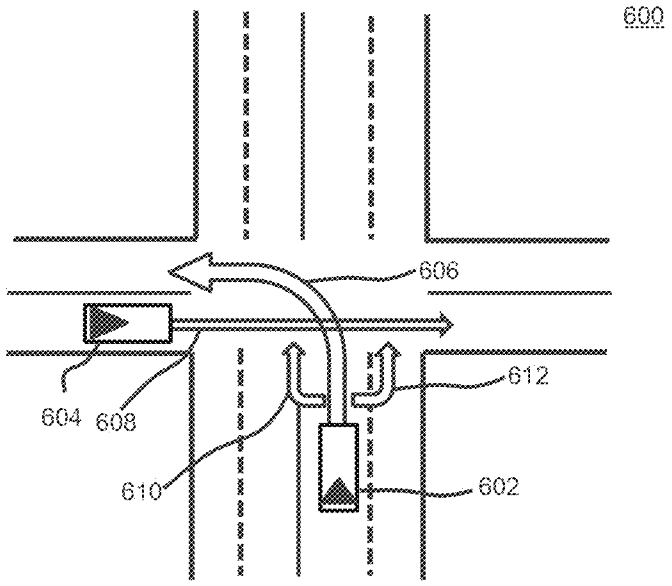
FIG. 6 illustrates non-limiting embodiments or aspects of a roadway environment in which systems, apparatuses, and/or methods, as described herein, may be implemented.
Figure 7:
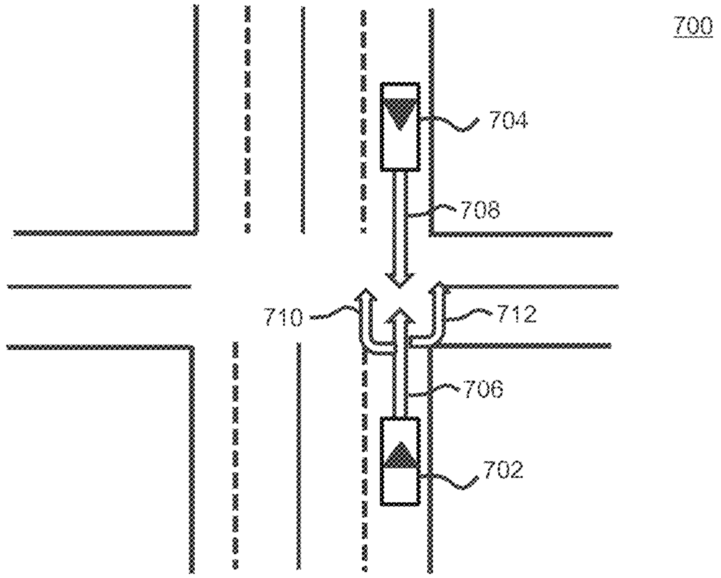
FIG. 7 illustrates non-limiting embodiments or aspects of a roadway environment in which systems, apparatuses, and/or methods, as described herein, may be implemented.

Further details of the characteristics that AV 102 may encounter in the roadway are shown and described in the description of FIGS. 5, 6, and 7. The illustrations are non-limiting examples of roadway situations where a trajectory of the actor is predicted to include at least one characteristic that is associated with invoking a conditionally disallowed action in the AV As shown in FIG. 4, at step 406, process 400 may include preventing AV 102 from executing a conditionally disallowed action based on conditions in the roadway. For example, in some non-limiting embodiments or aspects, AV 102 automatically restricts (e.g., eliminates, etc.) a conditionally disallowed action (e.g., one or more conditionally disallowed actions, etc.) from a motion plan of AV 102 to prevent AV 102 from executing the conditionally disallowed action in response to detecting that one or more conditions are present in the roadway.

In some non-limiting embodiments or aspects, when on-board computing device 112 detects cross traffic that is not non-compliant, on-board computing device 112 in association with motion planning 308 (e.g., motion planning stack) determines an action, such as whether to track ahead or track behind each cross traffic actor. For example, motion planning 308 generates a trajectory by detecting whether to proceed through the intersection in front of or behind the cross traffic actor. In addition, motion planning 308 may generate a trajectory including compensating actions that are unconditionally allowed. As an example, motion planning 308 may generate a path including a compensating action, either in addition to, or as an alternative to a more predictable trajectory. However, in some cases, compensating maneuvers are undesirable, and restricted, since they may not align with normal driving behavior, such as situations where human drivers would not, or would rarely, maneuver in such a compensating manner.

Restricting, in the above example, comprises eliminating or placing conditions on compensating maneuvers, so that on-board computing system 112 can manage the maneuvers of AV 102 to provide more predictability to other drivers on the roadway, and as a result may cause a more stable environment surrounding AV 102, while in turn avoiding unpredictable behavior or situations that may be caused by other drivers as a reaction to AV 102. On-board computing device 112 provides a more desirable trajectory that can be achieved based on situational characteristics in the roadway and related conditions. For example, related conditions may include when a mover in the roadway is moving sufficiently fast (e.g., over a predetermined velocity, or within a range, such as within a threshold of 1 meter/second), such that AV 102 will travel in a straight direction and then provides a brake action in order to give the mover a required clearance. In such an example, on-board computing device 112 generates a trajectory based on the conditions in the roadway, rather than trying to achieve a maximum clearance by maintaining speed and compensating by moving to one side or the other. Moreover, since on-board computing device 112 generates a trajectory based on the conditions, it can avoid expensive computations for generating, comparing, and/or optimizing multiple trajectories (e.g., trajectories comprising different actions or different combinations of actions for handling a set of candidate constraints, etc.) by generating only one trajectory (e.g., a trajectory to halt or slow down AV 102, to follow behind or let a cross-traffic actor complete a movement across the intersection, a trajectory to halt or slow the vehicle and allow the anti-routing mover pass, etc.).

Moreover, AV 102 automatically prevents the conditionally disallowed action by continually checking the roadway and removing a conditionally disallowed action from a candidate set of constraints used by motion planning 308 for generating a trajectory. For example, on-board computing device 112 determines a trajectory from the candidate set of constraints which includes actions that can form a trajectory, either singularly or in combination. As an example, on-board computing device 112 combines an action of following behind with an action of compensating to the right. On-board computing device 112 manages the candidate constraints, by preventing those that include an action known to cause unpredictability in the roadway when implemented under certain conditions. In some examples, the conditionally disallowed actions are related to compensating with a movement in a direction to the left of an actor's trajectory while passing ahead of a cross-traffic actor, compensating with a movement in a direction to the right of a trajectory of the actor while passing ahead of the actor in cross-traffic, compensating with a movement right of a trajectory of the actor during an anti-routing maneuver, or compensating with a movement left of a trajectory of the actor during an anti-routing maneuver.

In some non-limiting embodiments or aspects, on-board computing device 112 automatically restricts an action to prevent conditionally disallowed actions when predetermined conditions are satisfied. For example, on-board computing device 112 detects one or more conditions in the roadway, based on at least one of AV 102, actor 104, another actor in the roadway, signage in the roadway, traffic lights in the roadway, other movers in the roadway (e.g., bicyclist 108*a*, pedestrian 108*b*, an object in the roadway, and/or the like). Such actions can reliably predict that an action should be avoided. For example, on-board computing device 112 checks acquired data that has been detected to determine if the data is associated with a predictable behavior that can result in an action to be avoided. Alternatively, on-board computing device 112 checks acquired data that has been detected to determine whether an action to be performed should be avoided as a result of another action that is planned or expected to be performed.

In some non-limiting embodiments or aspects, on-board computing device 112 prevents AV 102 from executing a conditionally disallowed action after predicting that the trajectory of the actor is characterized by a cross-traffic maneuver when certain specific conditions are detected to be present in the roadway. For example, when a cross-traffic action is detected in the roadway, on-board computing device 112 prevents a conditionally disallowed action when the velocity of a cross-traffic maneuver of actor 104 in a lateral direction is greater than a predetermined velocity. In another example, on-board computing device 112 prevents an action when it detects a predetermined velocity of a cross-traffic actor. In such an example, a condition is determined to be present if actor 104 is detected to be moving laterally at greater than a set speed. For example, on-board computing device 112 detects a velocity of actor 104, a vehicle pose of actor 104, and makes a determination of the lateral speed to determine if or when the lateral speed reaches a speed greater than 2.0 meters/second; when the determined lateral speed reaches or exceeds the predetermined speed, on-board computing device 112 prevents conditionally disallowed actions for compensating movements in a direction away from actor 104 and, alternatively, prevents compensating movements towards actor 104 if the determined lateral speed of actor 104 exceeds 0.5 meters/second). On-board computing device 112 senses situations where other movers in the roadway are sensitive to small deviations in shape or timing of a maneuver of AV 102. For example, on-board computing device 112 changes a maneuver for compensating for actor 104 by making the conditionally disallowed action a prevented action. In such an example, the action is prevented, because it is determined that a condition is identified in the roadway where movers in the roadway, such as actor 104, are navigating, conditions that cause AV 102 to be particularly sensitive to small deviations in a shape or timing of the future path that is predicted for actor 104 or other movers in the roadway that are related.

In some non-limiting embodiments or aspects, on-board computing device 112 prevents an action when predicting actor 104 will cross the AV's path. On-board computing device 112, then checks or continuously rechecks the roadway for conditions present, such as, the actor is predicted to come within a predetermined distance of the AV's path, and/or a movement of the actor with respect to a lateral component of an actor's velocity is greater than a predetermined threshold as compared to a movement of the actor with respect to a longitudinal component of the actor's velocity. On-board computing device 112 is configured to generate a response restricting the conditionally disallowed action, such as, by limiting or removing altogether any compensating maneuvers from a set of actions available for motion planning by routing controller 231, or another controller or sensor shown in FIG. 2, which would otherwise be unconditionally available. Accordingly, when a condition is determined to be present in the roadway during certain characteristic maneuvers that are detected (e.g., predicted based on information detected related to other movers in the roadway, based on a predicted trajectory, based on a predicted velocity, based on a geographic location, based on a detected vehicle pose, etc.), on-board computing device 112 is configured to automatically remove such actions while managing movements of AV 102.

In some non-limiting embodiments or aspects, after eliminating a compensating maneuver, on-board computing device 112 may detect conditions where a compensating maneuver may be used. For example, on-board computing device 112 while controlling AV 102 in the roadway, detects a compensating movement should be unconditionally allowed, so that it may be used after being previously prevented. As an example, when actor 104 crosses the path of AV 102, on-board computing device 112 thereby triggers the reintroduction of a previously prevented unconditionally allowed action.

In some cases, an action (e.g., one or more actions) may be prevented unconditionally unless or until conditions in the roadway are determined to be present. In this way, an unconditionally prevented action would not be considered for a set of candidate constraints unless predetermined conditions are specified in the roadway, thereby eliminating a need to process an unconditionally prevented action until it has been updated to a conditionally disallowed action.

In some non-limiting embodiments or aspects, on-board computing device 112, detects with respect to a path of AV 102 that the lateral component of the actor's velocity is computationally significant compared to the longitudinal velocity. In such a case, a threshold significant lateral velocity triggers on-board computing device 112 to reintroduce (e.g., or introduce) the compensating maneuver in the case of minor lane invasions by actor 104 on faster roads where such an action is not unconventional.

In some non-limiting embodiments or aspects, on-board computing device 112 prevents AV 102 from executing a conditionally disallowed action after predicting that the trajectory of the actor is characterized in a geographic location, or in a geographic location where an anti-routing maneuver where certain specific conditions are detected to be present in the roadway. With oncoming anti-routing movers, in some instances, AV 102 lacks an ability to accurately predict on which side the mover will pass the AV. Accordingly, on-board computing device 112 is configured to automatically detect and remove an action when specified conditions occur before reaching actor 104. In this way, AV 102 can more efficiently and accurately traverse a roadway where actor 104 is performing an anti-routing maneuver, such that AV 102 prevents a conditionally disallowed action by eliminating the action from a candidate set of actions. The action may then remain restricted, labeled as restricted in AV 102 (e.g., motion planner of AV 102 or a database related to motion planning) until determining the restricted action can be reintroduced as a conditionally disallowed action to be performed, such as, for example, when on-board computing device 112 detects actor 104 attempting to pass on the right of AV 102 so that AV 102 also can compensate slightly right, or alternatively, perform a braking action to stop until actor 104 reaches AV 102. In such an example, unless on-board computing device 112 detects a strong indication of which side the mover is passing, the motion planner should prevent conditionally disallowed actions including compensating to the right and compensating to the left in some cases.

In some non-limiting embodiments or aspects, on-board computing device 112 detects that the one or more conditions are present when the actor is oncoming and is within a predetermined threshold distance of the AV's path. For example, to prevent compensating maneuvers in response to anti-routing movers approaching, oncoming actor 104 needs to be sufficiently close to the AV's path (e.g., 1 meter).

In some non-limiting embodiments or aspects, on-board computing device 112 detects that the one or more conditions are present when the actor is moving at a velocity greater than a predetermined speed. For example, oncoming actor 104 is traveling faster than a set speed of 1 meter/second.

In some non-limiting embodiments or aspects, on-board computing device 112, after detecting the one or more conditions, defers a selection of a trajectory until a trajectory associated with a route of the AV has been determined to be fully optimized. In such an example, on-board computing device 112 defers optimization until a trajectory includes an action for traversing any additional factors in the roadway.

After optimizing the trajectory, on-board computing device 112 generates a compensating trajectory which provides the AV with a motion plan that is planned to not include a compensating maneuver, by eliminating a compensating maneuver to account for a maneuver of actor 104. Compensating maneuvers to be eliminated may be determined based on a prediction of conditions in the roadway, such as movement of actor 104 into a different lane, movement in the same lane or road of AV 102 for a period of time, velocity of the movement, micro movements in the lane, micro speed indicators such as accelerations and decelerations, and/or the like.

After optimizing the trajectory, on-board computing device 112 may determine conditions where a compensating trajectory is unconditionally allowed. For example, on-board computing device 112 may update a motion plan to include conditionally disallowed actions that were previously prevented, and on-board computing device 112 generates a compensating trajectory which provides the AV with an operation to compensate for an actors movement into the AV's lane. In some cases, given certain time restrictions, on-board computing device 112 may determine conditions where a compensating trajectory is unconditionally allowed before optimizing is finished (e.g., partially optimized, etc.).

As shown in FIG. 4, at step 408, process 400 may include issuing a command to AV 102 to prevent the conditionally disallowed action. For example, in some non-limiting embodiments or aspects, AV 102 issues a command to control AV 102 on a candidate trajectory generated to prevent an option for the conditionally disallowed action. In this way, on-board computing device 112 manages the maneuvers of AV 102 through the elimination of actions that are normally unconditionally allowed.

When removing an unconditionally allowed action, AV 102 is managed to compensate for lane changes such as seen in FIGS. 5, 6, and 7 (described below). AV 102 is managed to consider compensating slightly left in response to determining that there is no traffic on the left of AV 102 which would prevent it from leftward movement, or right if there is no traffic on the right of AV 102. In this situation, the AV should consider both compensating and/or other options to defer the decision while the trajectories are being fully optimized, at which point the on-board computing device 112, along with the controller system and software shown in FIG. 2 can better reason about other factors in the scene. In some cases, the AV is managed to remove compensating maneuvers to the left and to the right when conditions in the roadway are found after deferring a decision.

In some non-limiting embodiments or aspects, AV 102 determines not to defer the decision like this for all situations. On-board computing device 112 may limit compensating to avoid a movement in the roadway based on conditions and/or when the generation of additional trajectories is computationally expensive, therefore it is more efficient to eliminate compensating movements before checking conditions that are present in the roadway (e.g., remove an action based only on a characteristic of a roadway, such as a cross traffic mover in an intersection crossing, or an anti-routing mover, etc.). Also, in situations where compensating should not be considered (cross traffic/anti-routing mover), on-board computing device 112 can determine quickly to halt AV 102 in its lane rather than attempting a compensating maneuver, thereby eliminating a need to consider passing, which eliminates the need to select from many candidate sets needed to generate and score such trajectories.

FIG. 5 illustrates an exemplary cross-traffic driving environment, where an AV on approach to an intersection, predicts a trajectory of a cross-traffic actor to account for while planning an action for moving across the intersection and generating a motion plan in accordance with the actor without implementing any unconditionally available actions to compensate laterally. For example, in some non-limiting embodiments or aspects, AV 502 approaches a four way intersection along trajectory 506, and AV 502 (e.g., on-board computing device 112, a self-driving system of AV 502, a computing device of AV 502, a server of AV 502, etc.) predicts maneuvers of actor 504 moving across the intersection, such as actor 504 (e.g., actor 104, bicyclist 108*a*, pedestrian 108*b*, and/or the like, in the roadway). In this example, AV 502 acquires data associated with actor 504 by detecting information in the roadway using sensors. In such an example, AV 502 is capable of sensing enough information about the surrounds and activity in the roadway, that it may accurately describe trajectory 508 which estimates the path of actor 504. When approaching the intersection, AV 502 generates a trajectory to pass through by tracking ahead or tracking behind actor 504. However, in some non-limiting embodiments or aspects, AV 502 also predicts that the trajectory of the actor comprises a cross-traffic trajectory. In such an example, AV 502 invokes a detection system to determine if conditions are satisfied to remove a conditionally disallowed action in AV 502 based on the roadway.

Continuing with FIG. 5, AV 502 continually monitors conditions related to actor 504, and other actors or objects in the roadway. AV 502 may restrict one or more conditionally disallowed actions. For example, AV 502 may restrict a lateral compensating action 510 for crossing behind actor 504 and/or a lateral compensating action 512 for crossing ahead of actor 504. In this way, self-driving systems of AV 502 prevent generation of a compensation path when encountering cross-traffic movers as illustrated in FIG. 5. This allows the self-driving system to generate a preferred trajectory, such as tracking behind the mover's current location until conditions change in the roadway.

FIG. 6 illustrates an exemplary cross-traffic driving environment, where an AV on approach to an intersection, predicts a trajectory of a cross-traffic actor to account for while planning an action for moving across the intersection and generating a motion plan in accordance with the actor without implementing any unconditionally available actions to compensate laterally. For example, in some non-limiting embodiments or aspects, AV 602 approaches a four way intersection along trajectory 606, and AV 602 (e.g., on-board computing device 112, a self-driving system of AV 602, a computing device of AV 602, a server of AV 602, etc.) predicts maneuvers of actor 604 that may occur while moving across the intersection or after it has navigated the intersection. This may occur for each mover, including actor 104, bicyclist 108*a*, pedestrian 108*b*, and/or the like, in the roadway. In this example, AV 602 acquires data associated with actor 604 by detecting information in the roadway using sensors. In such an example, AV 602 is capable of sensing enough information about the surrounds and activity in the roadway, that it may accurately describe trajectory 608 which estimates the path of actor 604. When approaching the intersection, AV 602 generates a trajectory to pass through by tracking ahead or tracking behind actor 604. However, in some non-limiting embodiments or aspects, AV 602 generates a trajectory to compensate for the trajectory of the actor comprises a cross-traffic trajectory. In such an example, AV 602 invokes a detection system to determine if conditions are satisfied to remove a conditionally disallowed action in AV 602 based on the roadway.

Continuing with FIG. 6, AV 602 continually monitors conditions related to actor 604, and other actors or objects in the roadway. AV 602 may restrict one or more conditionally disallowed actions. For example, AV 602 may restrict a lateral compensating action 610 for crossing behind actor 604 and/or a lateral compensating action 612 for crossing ahead of actor 604. In this way, self-driving systems of AV 602 prevent generation of a compensation path when encountering cross-traffic movers as illustrated in FIG. 6. This allows the self-driving system to generate a preferred trajectory, such as tracking behind the mover's current location until conditions change in the roadway.

FIG. 7 illustrates an exemplary cross-traffic driving environment, where an AV on approach to an intersection, predicts a trajectory of an anti-routing actor to account for while planning an action for traversing a roadway and generating a motion plan in accordance with the actor without implementing any unconditionally available actions to compensate laterally. For example, in some non-limiting embodiments or aspects, AV 702 approaches actor 704 along trajectory 706, and AV 702 (e.g., on-board computing device 112, a self-driving system of AV 702, a computing device of AV 702, a server of AV 702, etc.) predicts maneuvers of vehicles approaching in an anti-routing maneuver, such as actor 704 (e.g., actor 104, bicyclist 108*a*, pedestrian 108*b*, and/or the like, in the roadway). In this example, AV 702 acquires data associated with actor 704 by detecting information in the roadway using sensors of AV 702. In such an example, AV 702 is capable of sensing information about the surroundings and activity in the roadway. AV 702 (e.g., on-board computing device 112) then accurately describes trajectory 708 which estimates the path of actor 704. When approaching actor 704, AV 702 generates a trajectory to pass by compensating to the left or right of actor 704. However, in some non-limiting embodiments or aspects, AV 702 predicts the trajectory of the actor 704 comprises an anti-routing trajectory, a characteristic that invokes removal of the action or removal of authorization to perform the conditionally disallowed action in AV 702.

In such an example, AV 702 invokes detection system to determine if conditions are satisfied to remove a conditionally disallowed action in AV 702 based on the roadway. AV 702 continually monitors conditions related to actor 704, and other actors or objects in the roadway. AV 702 may restrict one or more conditionally disallowed actions. For example, AV 702 may restrict a lateral compensating action 710 for passing actor 704 on the left and/or a lateral compensating action 712 for passing actor 704 on the right. In this way, the self-driving system prevents the generation of at least one compensation path when encountering anti-routing movers as illustrated in FIG. 7.

Figure 8:
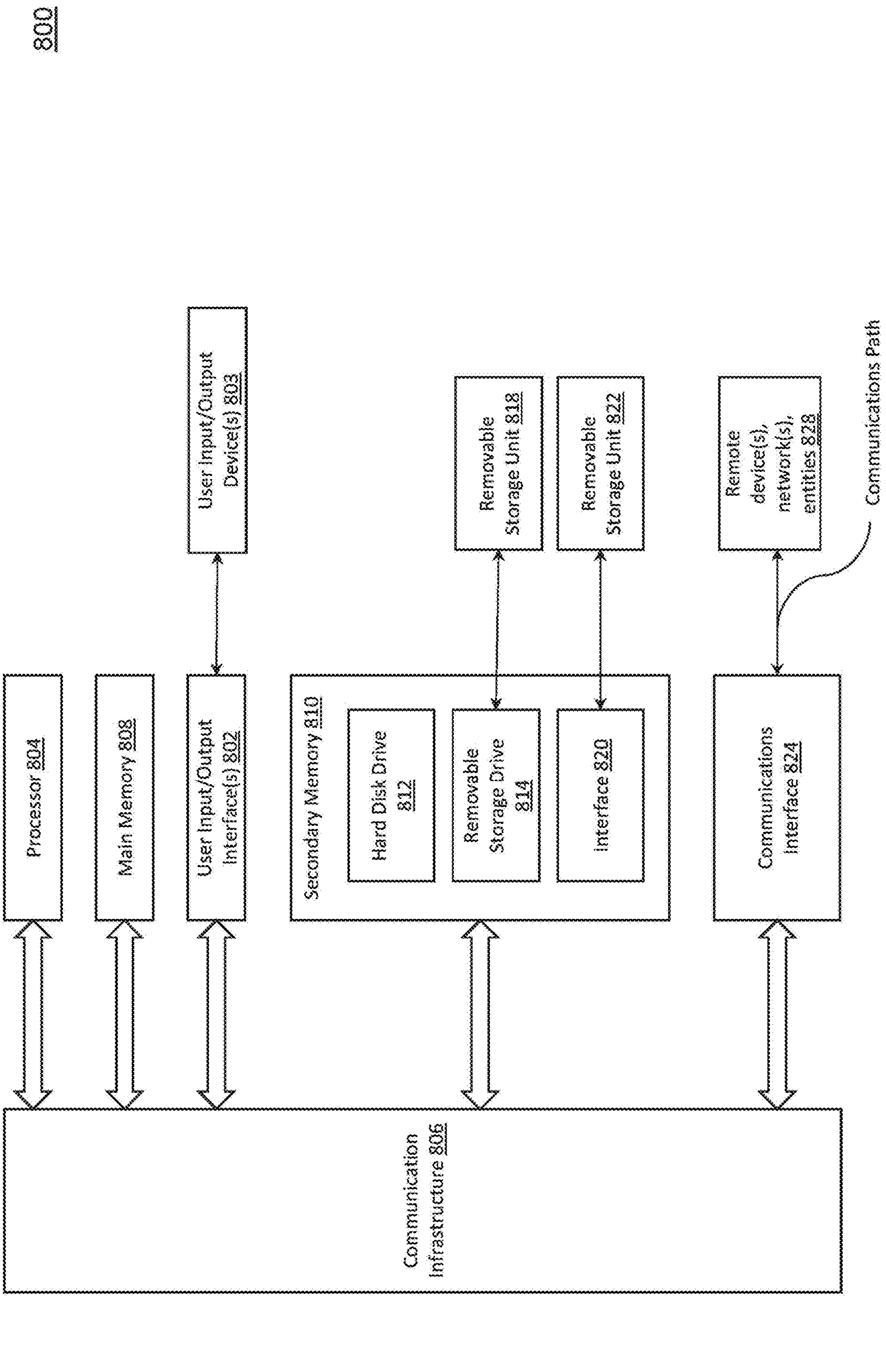
FIG. 8 provides a diagram of non-limiting embodiments or aspects of exemplary computer systems in which systems, apparatuses, and/or methods, as described herein, may be implemented.

FIG. 8 illustrates a diagram of an exemplary computer system 800 in which various devices, systems, and/or methods, described herein, may be implemented. Computer system 800 can be any computer capable of performing the functions described herein.

Computer system 800 includes one or more processors (also called central processing units, or CPUs), such as processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, and/or the like.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communications interface 824 enables computer system 800 to communicate and interact with any combination of remote devices, remote networks, remote entities, etc. (individually and collectively referenced by remote device(s), network(s), or entity(s) 828). For example, communications interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method of controlling an autonomous vehicle (AV) to maneuver in a roadway, comprising:

acquiring, by one or more processors of a vehicle computing system, data associated with an actor detected on a route of the AV in the roadway for sensing a trajectory of the actor;

predicting, by the one or more processors, that the trajectory of the actor includes at least one characteristic that is associated with invoking a conditionally disallowed action in the AV;

automatically restricting, by the one or more processors, the conditionally disallowed action from a motion plan of the AV to prevent the AV from executing the conditionally disallowed action in response to detecting that one or more conditions are present in the roadway; and after detecting the one or more conditions:

deferring a selection of a trajectory until a trajectory associated with the route of the AV has been determined to be fully optimized, and includes optimization for any additional factors in the roadway; and after optimizing the trajectory associated with the route of the AV, generating a compensating trajectory which provides the AV with an operation to compensate for an actors movement into the AV's lane;

issuing, by the one or more processors, a command to control the AV on a candidate trajectory generated to prevent an option for the conditionally disallowed action, wherein detecting that one or more conditions are present in the roadway, further comprises:

after predicting that the trajectory of the actor is characterized by a cross-traffic movement:

detecting a velocity of a cross-traffic movement of the actor in a lateral direction is greater than a predetermined velocity;

detecting the actor is predicted to cross the AV's path or, alternatively sensing that the actor is predicted to come within a predetermined distance of the AV's path; and detecting that a result of a lateral component of an actor's speed compared with a longitudinal component of the actor's speed is greater than a predetermined threshold.

2. The computer-implemented method of claim 1, wherein the data associated with the actor detected on the route of the AV further comprises information for sensing whether the actor traversing the roadway is on a trajectory predetermined to invoke the conditionally disallowed action in the AV.

3. The computer-implemented method of claim 2, wherein the trajectory of the actor comprises at least one of a cross-ahead movement, a four way stop, a left turn yield, or an anti-routing movement, includes a characteristic associated with invoking the conditionally disallowed action, and wherein the conditionally disallowed action includes compensating to a right of the actor, compensating to a left of the actor, or passing in front of the actor.

4. The computer-implemented method of claim 1, wherein preventing the conditionally disallowed action comprises removing the conditionally disallowed action from a candidate set of constraints for generating a trajectory, the candidate set of constraints including at least one of: compensating with a movement left of an actor's trajectory while passing ahead of a cross-traffic actor, compensating with a movement right of a trajectory of the actor while passing ahead of the actor in cross-traffic, compensating with a movement right of a trajectory of the actor during an anti-routing movement, or compensating with a movement left of a trajectory of the actor during an anti-routing movement.

5. The computer-implemented method of claim 4, wherein one or more conditions are detected in the roadway, when at least one of the AV, the actor, another actor in the roadway, signage in the roadway, traffic lights in the roadway, or an object in the roadway, are associated with a predictable behavior that can result in an action to be avoided, or an action to be performed that is avoided as a result of another action performed.

6. The computer-implemented method of claim 1, wherein detecting that one or more conditions are present in the roadway, further comprises:

after predicting that the trajectory of the actor is characterized by an anti-routing movement:

detecting the actor is oncoming and is within a predetermined distance of the AV's path; and detecting the actor is moving at a velocity greater than a predetermined speed.

7. A system, comprising:

a memory; and at least one processor coupled to the memory and configured to:

acquire data associated with an actor detected on a route of the AV in the roadway for sensing a trajectory of the actor;

predict that the trajectory of the actor includes at least one characteristic that is associated with invoking a conditionally disallowed action in the AV;

automatically restrict the conditionally disallowed action from a motion plan of the AV to prevent the AV from executing the conditionally disallowed action in response to detecting that one or more conditions are present in the roadway; and after detecting the one or more conditions:

deferring a selection of a trajectory until a trajectory associated with the route of the AV has been determined to be fully optimized, and includes optimization for any additional factors in the roadway; and after optimizing the trajectory associated with the route of the AV, generating a compensating trajectory which provides the AV with an operation to compensate for an actors movement into the AV's lane;

issue a command to control the AV on a candidate trajectory generated to prevent an option for the conditionally disallowed action, wherein detecting that one or more conditions are present in the roadway, further comprises predicting that the trajectory of the actor is characterized by a cross-traffic movement, in response to a prediction that the trajectory of the actor is characterized by a cross-traffic movement, the at least one processor is further configure to:

detect a velocity of a cross-traffic movement of the actor in a lateral direction is greater than a predetermined velocity;

detect the actor is predicted to cross the AV's path or, alternatively sensing that the actor is predicted to come within a predetermined distance of the AV's path; and detect that a result of a lateral component of an actor's speed compared with a longitudinal component of the actor's speed is greater than a predetermined threshold.

8. The system of claim 7, wherein the data associated with the actor detected on the route of the AV further comprises information for sensing whether the actor traversing the roadway is on a trajectory predetermined to invoke the conditionally disallowed action in the AV.

9. The system of claim 7, wherein the trajectory of the actor comprises at least one of a cross-ahead movement, a four way stop, a left turn yield, or an anti-routing movement, and includes a characteristic associated with invoking the conditionally disallowed action, wherein the conditionally disallowed action includes compensating to a right of the actor, compensating to a left of the actor, or passing in front of the actor.

10. The system of claim 7, wherein preventing the conditionally disallowed action comprises removing the conditionally disallowed action from a candidate set of constraints for generating a trajectory, the candidate set of constraints including at least one of: compensating with a movement left of an actor's trajectory while passing ahead of a cross-traffic actor, compensating with a movement right of a trajectory of the actor while passing ahead of the actor in cross-traffic, compensating with a movement right of a trajectory of the actor during an anti-routing movement, or compensating with a movement left of a trajectory of the actor during an anti-routing movement.

11. The system of claim 7, wherein one or more conditions are detected in the roadway, when at least one of the AV, the actor, another actor in the roadway, signage in the roadway, traffic lights in the roadway, or an object in the roadway, are associated with a predictable behavior that can result in an action to be avoided, or an action to be performed that is avoided as a result of another action performed.

12. The system of claim 7, wherein detecting that one or more conditions are present in the roadway, further comprises predicting that the trajectory of the actor is characterized by an anti-routing movement, in response to a prediction that the trajectory of the actor is characterized by an anti-routing movement, the at least one processor is further configured to:

detect the actor is oncoming and is within a predetermined distance of the AV's path; and detect the actor is moving at a velocity greater than a predetermined speed.

13. A non-transitory computer-readable medium having instructions stored thereon that, when executed by at least one computing device, cause the at least one computing device to perform operations comprising:

acquiring, by one or more processors of a vehicle computing system, data associated with an actor detected on a route of the AV in the roadway for sensing a trajectory of the actor;

predicting, by the one or more processors, that the trajectory of the actor includes at least one characteristic that is associated with invoking a conditionally disallowed action in the AV;

automatically restricting, by the one or more processors, the conditionally disallowed action from a motion plan of the AV to prevent the AV from executing the conditionally disallowed action in response to detecting that one or more conditions are present in the roadway; and after detecting the one or more conditions:

deferring a selection of a trajectory until a trajectory associated with the route of the AV has been determined to be fully optimized, and includes optimization for any additional factors in the roadway; and after optimizing the trajectory associated with the route of the AV, generating a compensating trajectory which provides the AV with an operation to compensate for an actors movement into the AV's lane;

issuing, by the one or more processors, a command to control the AV on a candidate trajectory generated to prevent an option for the conditionally disallowed action;

wherein detecting that one or more conditions are present in the roadway, further comprises instructions, that cause the at least one computing device to predict that the trajectory of the actor is characterized by a cross-traffic movement, and in response to a prediction that the trajectory of the actor is characterized by a cross-traffic movement, cause the at least one computing device to perform operations comprising:

detecting a velocity of a cross-traffic movement of the actor in a lateral direction is greater than a predetermined velocity;

detecting the actor is predicted to cross the AV's path or, alternatively sensing that the actor is predicted to come within a predetermined distance of the AV's path; and detecting that a result of a lateral component of an actor's speed compared with a longitudinal component of the actor's speed is greater than a predetermined threshold.

14. The non-transitory computer-readable medium of claim 13, wherein detecting that one or more conditions are present in the roadway, further comprises instructions, that cause the at least one computing device to predict that the trajectory of the actor is characterized by an anti-routing movement, and in response to a prediction that the trajectory of the actor is characterized by an anti-routing movement, cause the at least one computing device to perform operations comprising:

detecting the actor is oncoming and is within a predetermined distance of the AV's path; and detecting the actor is moving at a velocity greater than a predetermined speed.

* * * * *